H. Halvorson.
Ore Mill.
N° 50,633. Patented Oct. 17, 1865.
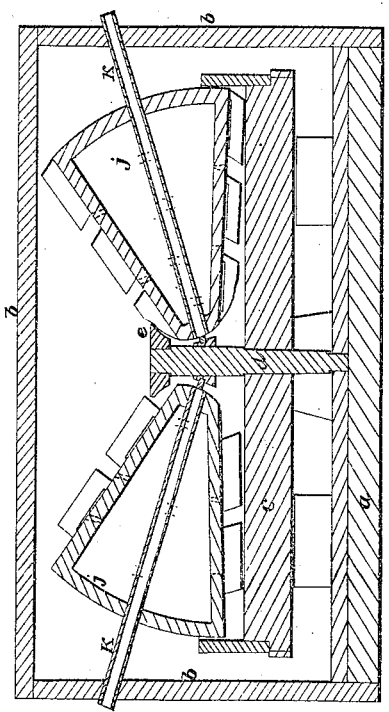
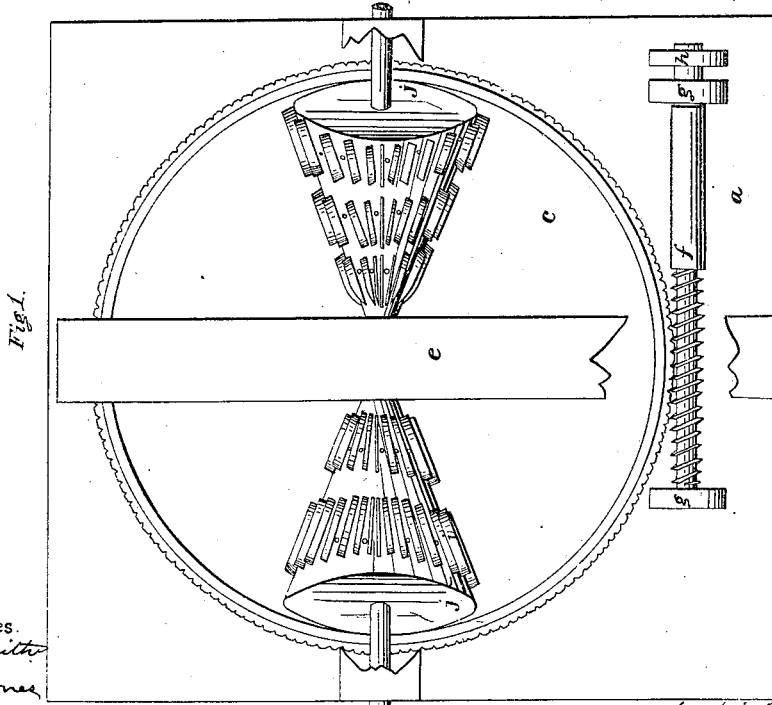
Witnesses.
T. Smith
L. Jones
Inventor.
H. Halvorson
by Atty T. T. Everetts

UNITED STATES PATENT OFFICE.

HALVOR HALVORSON, OF NORTH CAMBRIDGE, ASSIGNOR TO HIMSELF AND WM. TRACY EUSTIS, OF BOSTON; SAID HALVORSON AND EUSTIS ASSIGNORS TO THEMSELVES AND LEVI L. CUSHING, JR., OF CAMBRIDGE, MASSACHUSETTS.

IMPROVED APPARATUS FOR TREATING ORES.

Specification forming part of Letters Patent No. 50,533, dated October 17, 1865.

*To all whom it may concern:*

Be it known that I, HALVOR HALVORSON, of North Cambridge, in the county of Middlesex and State of Massachusetts, have invented a certain new and useful Machine for Treating Iron Pyrites and other Pyritous Ores; and I do hereby declare that the following is a full, clear and exact description of the same, reference being had to the accompanying drawings, and to the marks and letters thereon.

The drawings forming part of this specification represent a machine constructed under my invention, Figure 1 thereof being a view had by looking down on or into the machine; Fig. 2, a view of a vertical transverse section through the center of the shafts of the rotating cones, and Fig. 3 a view of a spade or shovel of each of the cones.

In all of these figures, where like parts are shown like marks and letters are used to indicate the parts.

The operative and movable parts of the machine rest upon and are supported by a platform, *a*, having attached thereto suitable frame-work, *b b*. A shallow pan, *c*, has a shaft, *d*, supported or having bearings in the platform and in a cross-bar, *e*, the pan revolving with or around the shaft, as may be preferred. The pan is revolved slowly by the worm-screw *f*, working into the teeth on the periphery of the projecting bottom of the pan, the worm or screw being sustained in uprights *g g*, and having at one of its ends a pulley, *h*, or some other proper mechanical device for connecting it with a motive power, or for the application of power to give it motion. As the pan rotates its floor will act upon the spades or shovels *i* of the cones, thus giving rotation to the cones. The form and relative position of these spades or shovels on the cones is shown best by Fig. 3.

The cones *j j* represent hollow ones rotating upon perforated tubes or hollow shafts *k k*, which are stationary. The perforations of these shafts or tubes are indicated in Fig. 2 by dotted lines, and the holes in the cones by circular lines in Fig. 1, they being in close proximity to the spades, and are for the escape of steam and hot air supplied to the cones through the perforated tubes or shafts as the cones revolve.

The object of this machine is this: Pulverized iron pyrites or pyritous ores, or ores containing them, are placed upon the floor of the pan, and then the machine is set in motion. By now introducing hot air and steam into the cones, which will pass into the pyritous dust, the conditions of warmth and moisture will be supplied, and thus promote and expedite the decomposition of the pyrites into protosulphate of iron and sulphuric acid. This phenomenon occurs in nature, but requires a long time. Pulverization of the ores facilitates the metamorphosis; but the additional conditions of heat and moisture, with the constant stirring up of the dust by the working of the machine, hasten the change exceedingly.

The machine is intended to be run constantly until the pyrites are decomposed, requiring from fifteen to twenty days under favorable circumstances.

I design to apply this machine to gold-bearing pyritous ores, thereby saving all other desulphurizing processes and getting rid of the largest portion of the ore, so that I have less bulk to extract the gold from. I propose to get the gold last, instead of seeking it first, as is the custom. If, instead of skimming the cream from the top of the milk, the milk were withdrawn from the cream through the bottom of the pan, the same amount of milk would yield a larger amount of cream and of a better quality. It is so with the Colorado ores that I have handled. First get rid of the débris and then collect the valuables.

This machine may be used in treating copper and other pyritous ores as successfully as for iron pyrites or gold or silver bearing ores containing or being combined with pyrites.

What I claim as my invention, and desire to secure by Letters Patent, is—

The machine constructed and susceptible of being operated substantially as and for the purposes set forth.

This specification signed this 8th day of May 1865.

HALVOR HALVORSON.

Witnesses:
 J. R. MORSE,
 GEO. H. EUSTIS.